Figure 2:
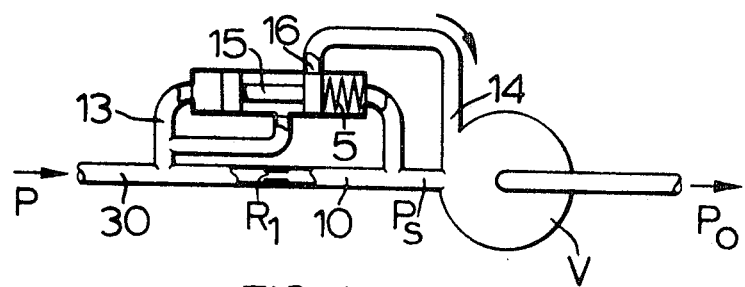

United States Patent

Smith et al.

[15] 3,638,672
[45] Feb. 1, 1972

[54] VALVES

[72] Inventors: Charles Philip Smith, Woverhampton; Stanley George Glaze, Brierley Hill, both of England

[73] Assignee: H. M. Hobson Limited, London, England

[22] Filed: July 24, 1970

[21] Appl. No.: 58,069

[52] U.S. Cl. ...................................................137/81.5
[51] Int. Cl. ........................................F15c 1/16, F15c 3/02
[58] Field of Search ..................................................137/81.5

[56] References Cited

UNITED STATES PATENTS

| | | | |
|---|---|---|---|
| 3,473,545 | 10/1969 | Boyadjieff | 137/81.5 |
| 3,563,484 | 2/1971 | Bray | 137/81.5 |
| 3,335,737 | 8/1967 | Gesell | 137/81.5 |
| 3,398,759 | 8/1968 | Rose | 137/81.5 |
| 3,511,257 | 5/1970 | Kien Chow | 137/81.5 |
| 3,515,158 | 6/1970 | Utz | 137/81.5 |
| 3,520,317 | 7/1970 | Goldschmied | 137/81.5 |
| 3,545,468 | 12/1970 | Freeman et al. | 137/81.5 |
| 3,563,260 | 2/1971 | Ellis | 137/81.5 |

*Primary Examiner*—Samuel Scott
*Attorney*—Martin Kirkpatrick

[57] ABSTRACT

Mechanism for providing constant or near constant flow of fluid in a conduit which comprises a fluidic vortex valve having its supply inlet and its outlet connected respectively to upstream and downstream sections of the conduit, a further valve sensitive to flow conditions in the conduit and controlling a flow line from the conduit to the control inlet of the vortex valve, the further valve being normally closed and arranged to open when the flow in the conduit attains a predetermined magnitude, and a restrictor in the conduit between the inlet to the flow line and the supply inlet to the vortex valve.

4 Claims, 6 Drawing Figures

VALVES

This invention provides a valve mechanism providing a constant or nearly constant flow of fluid irrespective of variations in supply pressure above a given limit and utilizing a fluidic vortex valve as an amplifier.

The expression "fluidic vortex valve" as used herein means a flat disclike cylindrical chamber having a supply inlet providing for a radial flow of supply fluid into the chamber, an outlet providing for axial flow of fluid out of the chamber and a control inlet providing for tangential flow of control fluid into the chamber. Such a valve can be used both with gaseous and liquid fluids and has the characteristic that, when fluid is supplied to the control inlet at a certain control pressure greater than the pressure of admission to the supply inlet a vortex flow will be established in the chamber with the result that the pressure drop between the supply inlet and the outlet is greatly increased for the same flow throughput.

A fluidic vortex valve is analogous to an electronic vacuum triode since a small control flow can be utilized to control a large supply flow and the vortex flow can be controlled by modification of the control pressure. The vortex flow can also be controlled by modifying the back pressure at the outlet since such modification will vary the pressure at the supply inlet and therefore the relation between the supply pressure and the control pressure.

The valve may have a plurality of supply and control inlets and a pair of outlets one at each end of the chamber. The supply slow may be provided by one or more radial holes in the peripheral wall of the chamber or by providing the chamber with a porous peripheral wall. Alternatively the supply inlet may be in an end wall of the chamber and communicate with an annulus within the chamber.

Figure 1A:
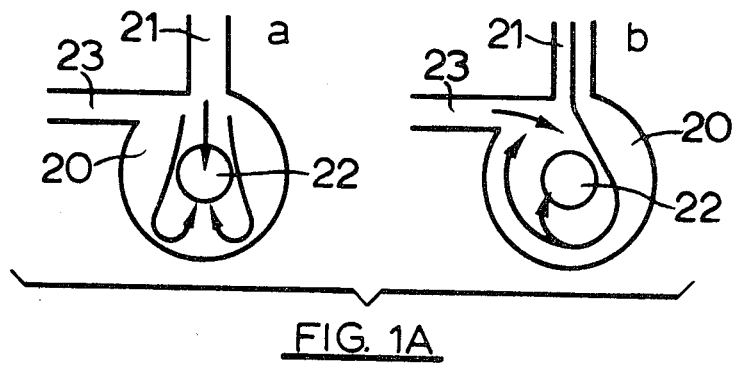
Figure 1B:
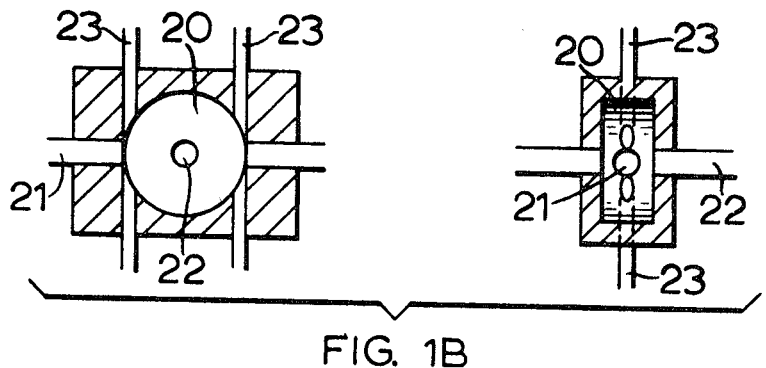
Figure 1C:
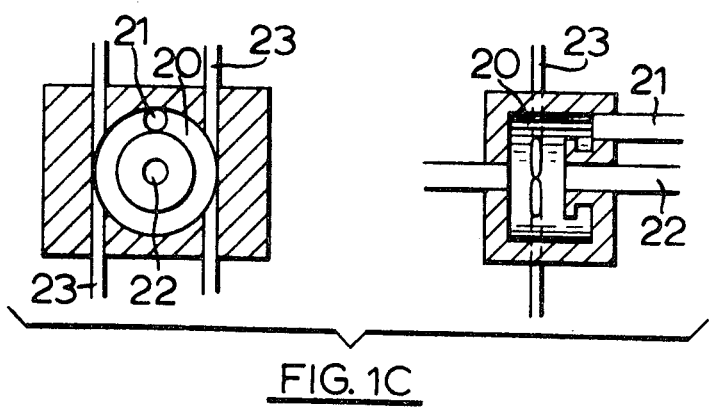

Such a fluidic vortex valve is illustrated in FIGS. 1A–1C of the accompanying drawings.

FIG. 1A shows diagrammatically the conditions in the cases (a) of no control flow and (b) of positive control flow, FIG. 1B shows a fluidic vortex valve with radial inlets, FIG. 1C shows a fluidic vortex valve with an annular inlet.

In each of the Figures, the chamber of the valve is indicated at 20, the supply inlet or inlets at 21, the outlet or outlets at 22 and the control inlet or inlets at 23.

In a typical case the diameter of the chamber may be 0.6 inch, its depth 0.1–0.3 inch, the diameter of each supply inlet may be 0.139 inch, the diameter of each control inlet may be 0.1 inch, and the diameter of the outlet may be 0.196 inch.

The invention provides mechanism for providing constant or nearly constant flow of fluid in a conduit which comprises a fluidic vortex valve having its supply inlet and its outlet connected respectively to upstream and downstream sections of the conduit, a further valve sensitive to flow conditions in the conduit and controlling a flow line from the conduit to the control inlet of the vortex valve, the further valve being normally closed and arranged to open when the flow in the conduit attains a predetermined magnitude, and a restrictor in the conduit between the inlet to the flow line and the supply inlet to the vortex valve.

Figure 3:
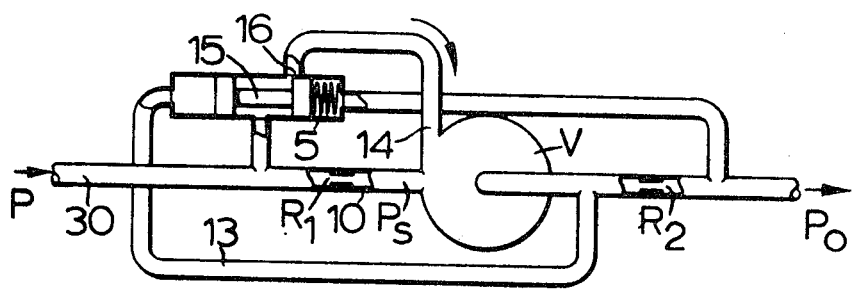
Figure 4:
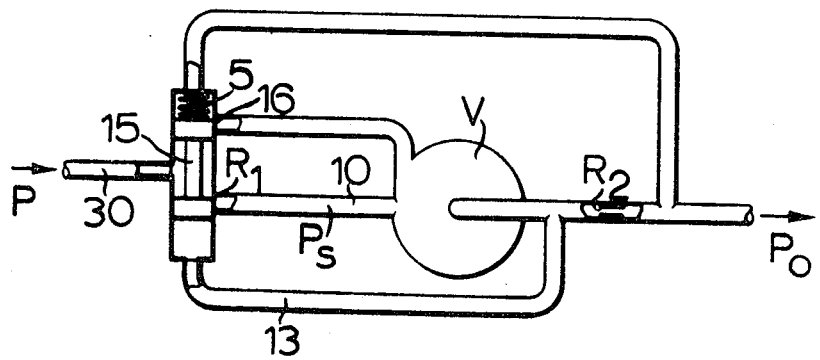

Certain embodiments of the invention are illustrated diagrammatically in FIGS. 2–4 of the accompanying drawings.

In the construction shown in FIG. 2, fluid enters a conduit 30 at pressure P and, after passage through a measuring restrictor $R_1$, flows into the radial supply inlet 10 of a vortex valve V at a lower pressure $P_s$. The fluid leaves through the axial outlet of the vortex valve V at pressure $P_o$. A flow line 13, leading from a point upstream of the restrictor $R_1$ to the tangential control inlet 14 of the vortex valve, is normally closed by a spool valve 15, which is held in the closed position by a spring 5. The valve 15 is subject at its opposite ends to the fluid pressures P and $P_s$ and when, as the result of increasing flow through the conduit, the pressure drop $P-P_s$ exceeds the load of the spring 5 the valve 15 moves to open a port 16 and causes a control flow to be injected into the vortex valve V. The resulting increase in pressure drop across the vortex valve V acts to prevent the flow in the conduit 30 from increasing substantially in response to increase in the supply pressure P above the value required to open the valve 15.

With this construction, since the control flow employed to support the excess overall pressure drop is not measured by the restrictor $R_1$, a flow which is completely constant under all conditions will not be achieved.

FIG. 3 shows a variant in which the valve 15 is subject at its opposite ends to the pressure drop across a restrictor $R_2$ downstream of the vortex valve V and therefore traversed by the control flow as well as the main flow. In the further variant shown in FIG. 4 the lower land of the valve 15 serves to provide the restrictor $R_1$ upstream of the vortex valve which ensures maintenance of the supply pressure to the vortex valve at a level lower than the control pressure.

While the constructions of FIGS. 3 and 4 provide for a more constant flow than that of FIG. 2 they are less efficient owing to the presence of two restrictors in the conduit 30.

As a further alternative the constructions shown in FIGS. 3 and 4 may be modified by substituting a venturi for the restrictor $R_2$ downstream of the vortex valve and subjecting the spool valve 15 to the pressure at the throat of the venturi.

In suitable cases provision may be made for varying the flow by varying the load applied by the spring 5 to the spool valve 15.

What we claim as our invention and desire to secure by Letters Patent is:

1. Flow regulating mechanism for maintaining a substantially constant flow of fluid in a flow conduit irrespective of variations in supply pressure to said conduit above a predetermined magnitude, said flow regulating mechanism comprising a single fluidic vortex valve, said vortex valve being constituted by a flat disclike cylindrical chamber having a supply inlet connected to an upstream section of the flow conduit and providing a radial flow of fluid from said upstream section into the chamber, an outlet connected to a downstream section of the flow conduit and providing an axial flow of fluid from the chamber into said downstream section and a control inlet providing tangential flow of fluid into the chamber, a restrictor in said upstream section of the flow conduit, a branch conduit connected between a point in said upstream section of the flow conduit upstream of said restrictor and said control inlet, a spool valve controlling the flow of fluid through said branch conduit, the spool valve being subject at its opposite ends to fluid pressures derived from points in said flow conduit at which different fluid pressures prevail, and a spring loading the spool valve and normally maintaining it in position to close the branch conduit, said spool valve opening in response to increase in supply pressure above said predetermined magnitude to admit fluid to said control port and thereby prevent substantial increase in the flow of fluid through said flow conduit.

2. Flow regulating mechanism as claimed in claim 1, wherein said spool valve is subject at its opposite ends to the fluid pressures at points in the upstream section of the flow conduit on opposite sides of the restrictor.

3. Flow regulating mechanism as claimed in claim 1, which includes a second restrictor in the downstream section of the flow conduit and wherein said spool valve is subject at its opposite ends to the fluid pressures at points in the downstream section of the flow conduit on opposite sides of said second restrictor.

4. Flow regulating mechanism as claimed in claim 1, wherein said restrictor is provided by a land of said spool valve.

* * * * *